(12) United States Patent
Engelbrecht et al.

(10) Patent No.: US 7,128,576 B2
(45) Date of Patent: *Oct. 31, 2006

(54) ADHESION PROMOTERS FOR SILICONE MATERIALS

(75) Inventors: Jürgen Engelbrecht, Elmshorn (DE); Martin Kix, Elmshorn (DE)

(73) Assignee: S & C Polymer, Silicon- und Composite-Spezialitation GmbH, Elmshorn (DE)

(*) Notice: Subject to any disclaimer, the term of this patent is extended or adjusted under 35 U.S.C. 154(b) by 0 days.

This patent is subject to a terminal disclaimer.

(21) Appl. No.: 10/620,268

(22) Filed: Jul. 14, 2003

(65) Prior Publication Data
US 2004/0010110 A1    Jan. 15, 2004

(30) Foreign Application Priority Data
Feb. 9, 1999    (DE) ................ 199 05 224

(51) Int. Cl.
*A61C 13/10* (2006.01)

(52) U.S. Cl. ............ 433/168.1; 528/31; 434/202.1; 106/35

(58) Field of Classification Search ........... 523/120; 106/35; 528/31; 433/168.1, 208.1, 202.1
See application file for complete search history.

(56) References Cited

U.S. PATENT DOCUMENTS

| | | | | |
|---|---|---|---|---|
| 5,476,912 A | * | 12/1995 | Hosoi et al. ............ | 526/279 |
| 6,251,966 B1 | * | 6/2001 | Fry et al. ............... | 523/109 |
| 6,255,407 B1 | * | 7/2001 | Neffgen ................. | 525/342 |
| 6,403,751 B1 | * | 6/2002 | Engelbrecht et al. ...... | 528/25 |
| 6,566,479 B1 | * | 5/2003 | Bublewitz et al. ........ | 528/15 |
| 6,612,836 B1 | * | 9/2003 | Engelbrecht ............ | 433/37 |

OTHER PUBLICATIONS

Abstract JP 04-068007 (Mar. 1992).*

* cited by examiner

*Primary Examiner*—Margaret G. Moore
(74) *Attorney, Agent, or Firm*—Frommer Lawrence & Haug LLP; Ronald R. Santucci

(57) ABSTRACT

The invention relates to copolymers, obtained by the copolymerisation of SiH-group-containing siloxanes with vinyl-group-containing compounds. The copolymers comprise at least two SiH groups. The SiH-groups-containing siloxanes and the vinyl-group-containing compounds are linked to one another via C—Si bonds.

4 Claims, No Drawings

ADHESION PROMOTERS FOR SILICONE MATERIALS

TECHNICAL FIELD

The present invention relates to copolymers of hydrogen siloxanes and unsaturated compounds, to adhesives solutions made therefrom, to their use as adhesion promoters for promoting adhesion between silicone relining compositions and protheses, to their use as adhesion promoters for promoting the adhesion of addition-crosslinking vinyl silicone impression compositions to impression trays, and to other uses.

BACKGROUND ART

Materials for dental prostheses generally consist of polymethylmethacrylate or of copolymers of different methacrylates. When a prosthesis no longer fits well, it must be manufactured afresh or relined (corrected). This relining may be effected with prosthesis material again (a hard relining) but it may also be necessary to choose a significantly softer material for such purposes (a non-hardening relining). With the average age increasing, there is a considerable rise in the demand for the last-mentioned soft materials.

Customary soft relining materials consist of polymethacrylates to which plasticiser has been added or of silicone. The polymethacrylates to which plasticiser has been added can be polymersied onto the (polymethylmethacrylate) prosthesis material, but in the course of a few months they become harder to the point of brittleness as a result of the plasticiser's dissolving out.

Relinings with silicon elastomers do not exhibit such brittleness. They remain soft over a prolonger period, but on the other hand the provision of a firm bond between silicone and polymethacrylates always presents a considerable problem. Even when attempts are made to join the layers mechanically by etching or mechanical roughening, the silicone layer becomes detached from the prosthesis after a few weeks or even after a few days.

Several methods of solving this problem by chemical means have been described. For example, DE 196 35 696 A1 describes polymers containing reactive groups, such as —OH or —NH, to which hydrogen silicone units are linked, with hydrogen being removed. Solutions of such a SiH-group-containing copolymer, after being applied to the surface of a prosthesis, are able to react with and become bonded to a vinyl silicone layer applied thereto. Since the hydrogen siloxane units are linked via —C—O—Si— or Via C—NH—Si— bonds, adhesive bonds made in accordance with this Offenlengungsschrift are extremely hydrolysis-labile in the aqueous environment of the mouth and are suitable only for short-term temporary relinings of a few days.

A better solution to the problem is described in EP 0 632 060 A1 which describes for such purposes copolymers that are prepared by copolymerisation of methylacrylates with vinyl- or allyl-methacrylates, hydrogen silicones having an adequate SiH content then being linked to the free vinyl or allyl groups with the aid of a platinum catalyst.

Solutions of such SiH-group-containing copolymers, after being applied to the surface of a prosthesis, are likewise able to react with and become bonded to a vinyl silicone layer applied thereto. The hydrogen siloxane units are linked to the polymer chain structures via ester groups —CO—O—, have better resistance to hydrolysis and are therefore effective over a longer period of time as promoters of adhesion between the material of the prosthesis and the applied silicone, even in the aqueous environment of the mouth. The preparation process is a multiple-step procedure, however, and is therefore inconvenient and expensive and the polymers prepared nevertheless have acid- and base-sensitive ester groups.

SUMMARY OF THE INVENTION

The invention is described to new copolymers having greater resistance to hydrolysis that, especially when used in the form of a solution, result in lastingly stable, moisture-resistant adhesion behaviour between prosthesis material and non-hardening silicone relining and also optionally between the material of an impression tray and the silicone of the impression material.

These copolymers can be obtained by the copolymerisation of SiH-group-containing siloxanes with vinyl-group-containing compounds, the copolymers comprising at least two SiH groups and the SiH-group-containing siloxanes and the vinyl-group-containing compounds being linked to one another via C—Si bonds.

DISCLOSURE OF THE INVENTION

According to the invention, it has unexpectedly been possible to obtain extremely hydrolysis-resistant, SiH-rich, copolymers by the simple copolymerisation of hydrogen siloxanes (SiH-group-containing siloxanes), which preferably contain no unsaturated groups, and unsaturated compounds (especially vinyl-group-containing compounds). Adhesives of the invention prepared therefrom exhibit, especially in the form of solutions, extremely good, long-lasting and moisture-resistant adhesion properties, especially when used as adhesives between partially soluble plastics and silicone compositions that are crosslinkable by addition reactions. The SiH-group-containing siloxanes that are used contain preferably at least two SiH groups, preferably at least three SiH groups. As vinyl-group-containing compounds there are used especially acrylates, vinyl benzenes, vinyl ethers, alkyl or allyl compounds, vinyl silanes or derivatives or mixtures thereof, special preference being given to monoacrylates, monovinyl benzenes, monovinyl ethers, monoallyl compounds, monovinyl silanes or derivatives or mixtures thereof. According to a further embodiment, the vinyl-group-containing compounds may contain at least one further functional group, there being preferred as further functional groups hydrogen silyl, alkoxysilyl, epoxy or aziridine groups.

Copolymer solutions prepared according to the invention are excellently suitable, for example, for application to prostheses, in which case, after drying, an addition-crosslinkable vinyl silicone relining material can be applied and the prosthesis material and the silicone relining material are moisture-resistantly bonded (adhesively bonded) to one another for a long period (e.g. 1 year).

A further use of this kind of silicone adhesives is that they are also excellently suitable for causing relining compositions to adhere to impression trays, e.g. of polystyrene or polycarbonate. Conventional silicone adhesives (for example solutions of silicones rendered viscous by crosslinking) for impression trays have never been able to achieve such a high degree of adhesiveness. Impression trays have always had to have additional mechanical retaining means in order to prevent the impression composition from lifting away from its tray, which has always resulted in the dimensions of the impression being incorrect. Solutions prepared according to the invention are therefore also excellently suitable for application to partially soluble plastics, especially plastics impression trays, with the result that after the subsequent application of impression compositions an irreversible bond is formed between the impression tray and the vinyl silicone of the impression material.

Furthermore, copolymers according to the invention are also suitable as crosslinker components in addition-crosslinking silicone formulations and as starting materials for grafter polymers.

According to the invention there are especially disclosed copolymers comprising, especially in the longest chain (base chain), repeating units a) of the formula

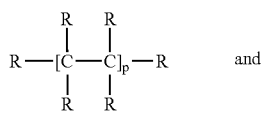
(I)

and b) of the formula

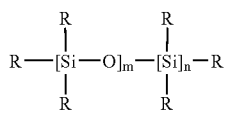
(II)

wherein m and p are each independently of the other whole numbers <0, n is 1, each of the radicals R independently of the others may be a H atom or a substituted or unsubstituted alkyl group, a group of the formula =CR'$_2$, ——CR'$_2$—OR', —OR', —COOR', —SiR'$_3$, or a phenyl group optionally substituted by one or two —CR'=CR'$_2$ groups or a bond to the group I or II, each of the radicals R' independently of the others being a H atom or a substituted or unsubstituted alkyl group, with the proviso that the groups of the formula II contain at least one SiH group and that the group of the fomrilae I and II are linked to one another via C—Si bonds. Preferably the alkyl groups have 1, 2, 3, 4, 5, 6, 7 or 8 carbon atoms, preferably 1, 2, 3, 4, 5 or 6 carbon atoms, which are especially arranged linearly. Examples of alkyl groups are methyl, ethyl or n-propyl, isopropyl, n-butyl, isobutyl, n-pentyl and n-hexyl groups.

Preferably m has the value 1, 2, 3, 4, 5, 6, 7 or 8.

According to an especially preferred embodiment, the radicals R are defined according to how they are obtained by reaction of the Si—H-containing siloxanes and vinyl-group-containing compounds defined in this Application.

According to the invention, the radicals R or R' may contain at least one further functional group, there being preferred as further functional groups hydrogen silyl, alkoxysilyl, epoxy or aziridine groups.

The copolymers have preferably an average weight mean of the molecular weight of from 5000 to 1 000 000, especially from 20 000 or 200 000. The copolymers according to the invention preferably have the groups (I:II) in a ratio of at least 25:1 or at least 10:1 or at least 5:1. The base chains have preferably ably at least 50 of the above groups I and/or II.

Copolymers according to the invention are also suitable as crosslinker components in addition-crosslinking silicone formulations and as starting materials for graft polymers.

The copolymers of the invention can be prepared by simple copolymerisation of unsaturated compounds in the presence of hydrogen siloxanes. In that procedure preferably photochemical (photosensitive) or thermal free radical formers are used as polymerisation catalysts.

The copolymerisation according to the invention is presumably a combination of polymerisation with hydrosilylation taking place at the same time:

It is assumed that in the case of free radical polymerisation on the one hand alkylene free radical chain fragments (A) are formed by polymerisation of some of the unsaturated groups,

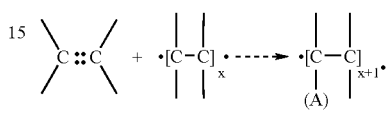

wherein x=any value, and on the other hand, by reaction with polyalkylene free radicals, hydrogen siloxane free radical fragments (B) are formed

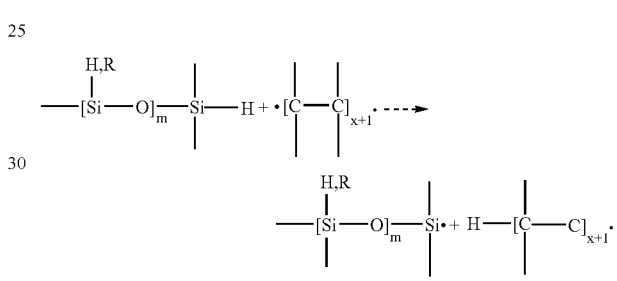

(free radical hydrosylation) which are able to react with further unsaturated compounds to form longer free radical chains

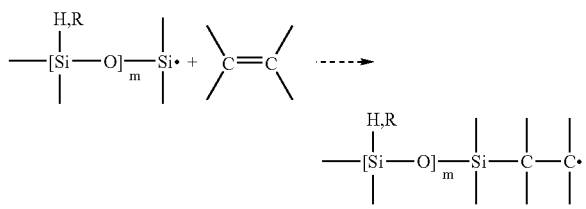

or recombine with polyalkylene free radicals.

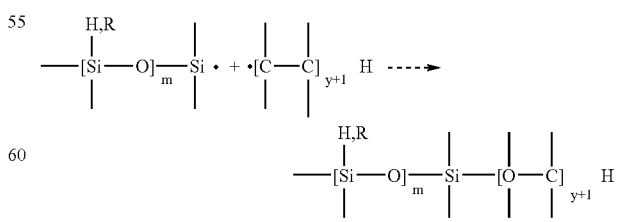

In that procedure it is also possible for a number of SiH groups of a hydrogen siloxane to be bonded into the polymer chains:

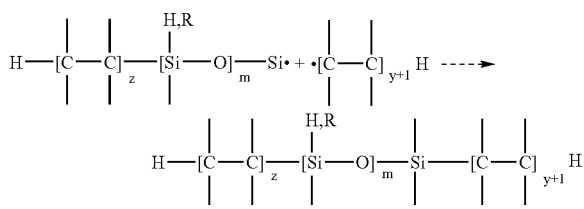

m, y, z any whole number, m preferably being from 1 to 5. Further reactions/combinations are possible and probable.

In simple terms, the copolymers formed during the free radical polymerisation may consist of combinations of different polyalkylene chain fragments and different hydrogen siloxanes fragments:

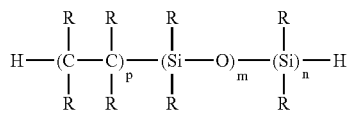

A polymer according to the invention may have, for example, the formula (polyalkylene)$_u$(siloxane-SiH)$_v$ wherein the ratio of the number of linked (polyalkylene) fragments and linked (SiH-siloxane) fragments may, according to the starting concentrations of hydrogen siloxanes and unsaturated compounds, be identical or different and have any value.

The (SiH-siloxane) units may be bonded to the C—C chains (polyalkylene moiety) by either lateral or terminal linkages.

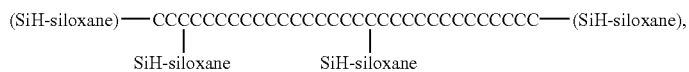

but they may also, linked on two or more sides as siloxanes units be an integral part of the chain structure:

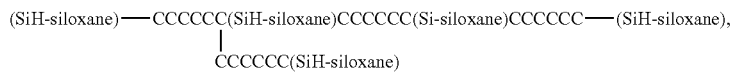

and mixtures of all types.

In all cases, the hydrogen siloxane chain components are linked to the alkylene chain components via hydrolysis-resistant Si—C bonds and are, for example, as

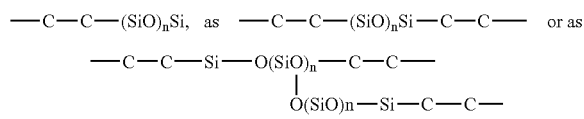

an integral constituent of the copolymer structure chain. The Si—C linkage is clearly the reason for the extremely good and long-lasting resistance to hydrolysis when the copolymers according to the invention are used in adhesive formulations in a moist environment.

The hydrogen siloxanes used, that is to say compounds containing the group H—Si—O—, are commercially available as crosslinkers for platinum-catalysed, addition-crosslinking vinyl silicones. They are generally short-chain polysiloxanes having from 2 to 9 silicon hydrogen groups. For the use according to the invention, the hydrogen siloxane should contain at least two SiH groups, more advantageously three, four or more.

Suitable as unsaturated compounds are especially those compounds which are readily polymersiable: α,β-unsaturated esters, anhydrides and amides, aromatic vinyl compounds, vinyl ethers, vinyl silanes and allyl compounds. Especially suitable are monofunctional, unsaturated compounds, such as methylmethacrylate, ethylmethacrylate, butyl(meth)acrylate, acrylonitrile, vinyl benzene, monovinyl ether and vinyl diphenyl silane, especially vinyl diphenyl hydrogen silane.

Interesting copolymers having additional reaction groups can be obtained when the unsaturated compound contains also at least one reaction group that does not participate in the polymerisation and accordingly is present in the copolymer after its manufacture. For example, polymerisation of hydrogen siloxanes with glycidyl methacrylate yields a copolymer that contains epoxy groups in addition to the SiH groups. Polymerisation of liydrogen siloxanes with vinyl triethoxysilane yields a copolymer that contains Si(OC$_2$H$_5$)$_3$ groups in addition to SiH groups.

The copolymers according to the invention and solutions thereof are used as adhesives for the long-lasting bonding of dental prostheses to silicone relinings for dental prostheses, the silicon relinings being especially non-hardening silicone relinings, such as addition-crosslinking vinyl silicones. Furthermore, the copolymers and solutions thereof can be used as adhesives for bonding addition-crosslinking vinyl silicone impression compositions to impression trays.

In addition, the copolymers according to the invention are also suitable as coatings for noble and non-noble metals, glass, silicates, teeths and ceramics.

The properties of the copolymers according to the invention and solutions thereof are determined to a great extent by the ratios of the different repeating structural units of the copolymer. In the case of the uses according to the invention as adhesives, the polyalkylene moieties are, for example, important in order that they mix intimately in microregions with plastics to be partially dissolved and to be bonded, while on the other hand a large number of SiH groups of the siloxane units in and on the chain structure of the copolymer promotes good binding into a vinyl silicone applied thereto. The ratio of SiH-siloxane components to polyalkylene components in the copolymer should in advantageous embodiments be at least 1:25, in preferred embodiments at least 1:10 and in especially preferred embodiments at least 1:5.

Suitable polymerisation catalysts for the copolymerisation are thermal free radical formers, such as dibenzoyl peroxide, dibutyl peroxide, acetylcyclohexylsulphonyl peroxide, azobisisobutyronitrile, azobismethylpropane, azobismethoxydimethylvalernitrile and optionally corresponding co-initiators, such as amines or sulphinic acid salts. Suitable polymerisation catalysts may also be photochemical (photosensitive) free radical formers, such as benzophenones, benzoins, (α,β-diketones and suitable co-initiators.

Suitable catalysts may also be non-free-radical polymerisation catalysts, such as triisobutylaluminium, lithium aluminium tetrahydrides or titanium chlorides, but free radical polymerisation catalysts are especially preferred.

To form a solution, at least one readily volatile solvent may be added to the copolymers according to the invention.

Suitable solvents for adhesive solutions according to the invention are especially readily volatile, inert solvents, such as halogenated or non-halogenated aliphatic or aromatic hydrocarbons, ethers, ketones, esters or cyclic siloxanes.

The copolymers of the invention may also be used according to the invention for purposes other than those indicated, such as, for example, as crosslinker components in addition-crosslinking vinyl silicone mixtures or alternatively as starting components for the manufacture of copolymers further modified by grafting, in which the SiH groups or other reactive groups also incorporated by polymerisation can act as linkage points for grafting on other functional groups. The invention relates also to those uses.

The invention will be explained in more detail with reference to the following embodiments given by way of example

EXAMPLE 1

Preparation of a copolymer according to the invention 0.3 g of benzoyl peroxide are added to a solution of 20 g of ethylmethacrylate, 40 g of polyfunctional hydrogen siloxane (crosslinker 430 from Bayer AG) and 40 g of toluene. The solution is heated at 90° C. for 2 hours. After cooling to room temperature, the toluene is evaporated off under reduced pressure and the residue that remains is washed free of crosslinker with a mixture of ethanol/methanol 1:1. A gel-like polymer is obtained.

EXAMPLE 2

Adhesive solution for adhesively bonding nonhardening silicone relining material for prosthesis material For the purpose of producing an adhesive solution according to the invention, 10 parts of the resulting polymer are dissolved in 90 parts of acetone. The adhesive solution so obtained is applied thinly with a brush to the cleaned, abraded plastics of a prosthesis to be relined. After allowing the solvent of evaporate (about 30 sec); semitransparent addition-crosslinking vinyl silicone material having a Shore A hardness of about 30 is immediately poured in a thin layer onto the adhesive-treated surface and the prosthesis is placed in the mouth. After waiting for a period of 3 minutes to allow the silicone to harden, the prosthesis is removed from the mouth. The vinyl silicone is securely bonded to the prosthesis. When attempts are made to detach the material from the plastics of the prosthesis again, the silicone relining material tears, but the silicone does not become detached from the prosthesis base.

Even when the prosthesis relined according to the invention is stored in water at 40° C. for 4 weeks and when stored in the same way in prosthesis cleaning solutions (Corega-Tabs) changed daily, the secure bond between the silicone relining material and the prosthesis did not exhibit any weakening.

EXAMPLE 3

Adhesive solution for fixing vinyl silicone impression material to impression trays The adhesive solution from Example 1 is applied in a thin layer to a commercially available plastics impression tray (polycarbonate) which does not have the mechanical retaining means (holes, ribs) otherwise customary and is allowed to dry for 1 minute. The tray is then charged with addition-crosslinking silicone impression material and placed in the mouth. When the hardening time has elapsed, the tray is removed from the mouth. The impression composition is so securely bonded to the impression tray that it can be removed from the tray again only by destruction.

While the invention has been described in conjunction with the specific embodiments outlines above, it is evident that many alternatives, modifications, and variations will be apparent to these skilled in the art. Accordingly, the preferred embodiments of the invention are intended to be illustrative and not limiting. Various changes may be made without departing from the spirit and scope of the invention as defined in the claims.

What is claimed is:

1. A method of bonding dental prostheses and silicone relinings for dental prostheses comprising contacting the dental prosthesis and the silicone relining to be bonded with an adhesive comprising one or more copolymers obtained by the copolymerisation of SiH group-containing siloxanes with unsaturated compounds, wherein at least one of the copolymers comprises at least two SiH groups and repeating structural units in its base chain of of the formula (I)

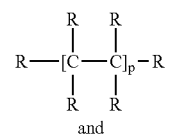

and of the formula (II)

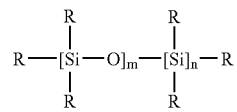

wherein m and p are each independently whole numbers greater than 0, wherein n is 1, wherein each of the radicals R is independently selected from the group consisting of an H atom, an alkyl group, a group of the formula =CR'$_2$, —CR'$_2$—OR', —OR', —COOR', —SiR'$_3$, a phenyl group, a phenyl group substituted by one or two —CR'=CR'$_2$ groups, and a bond, wherein if one of the radicals selected is =CR'$_2$, then one of the other radicals on the atom to which the =CR'$_2$ is bound is bond to the =CR'$_2$ radical, and wherein each of the radicals R' is independently selected from the group consisting of an H atom and a substituted or unsubstituted alkyl group, and wherein the structural units of formula II contain at least one SiH group and the structural units of formulae I and II are linked to one another via C—Si bonds.

2. The method of claim 1 wherein the silicone relinings are resilient silicone relinings.

3. The method of claim 1, wherein the silicone relinings comprise addition-crosslinking vinyl silicones.

4. A method of bonding addition-crosslinking vinyl silicone impression compositions to impression trays comprising contacting the addition—crosslinking vinyl silicone impression composition and the impression tray to be bonded with an adhesive comprising one or more copolymers obtained by the copolymerisation of SiH group-containing siloxanes with unsaturated compounds, wherein at least one of the copolymers comprises at least two SiH groups and repeating structural units in its base chain of the formula (I)

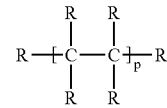

and of the formula (II)

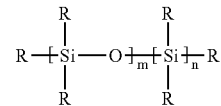

wherein m and p are each independently whole numbers greater than 0, wherein n is 1, wherein each of the radical R is independently selected from the group consisting of an H atom, an alkyl group, a group of the formula =CR'$_2$, —CR'$_2$—OR', —OR', —COOR', —SiR'$_3$, a phenyl group, a phenyl group substituted by one or two —CR'=CR'$_2$ groups, and a bond, wherein if one of the radicals selected is =CR'$_2$, then one of the other radicals on the atom to which the =CR'$_2$ is bound is a bond to the =CR'$_2$ radical, and wherein each of the radicals R' is independently selected from the group consisting of an H atom and a substituted or unsubstituted alkyl group, and wherein the structural units of formula II contain at least one SiH group and the structural units of formulae I and II are linked to one another via C—Si bonds.

* * * * *

UNITED STATES PATENT AND TRADEMARK OFFICE
CERTIFICATE OF CORRECTION

PATENT NO. : 7,128,576 B2  Page 1 of 1
APPLICATION NO. : 10/620268
DATED : October 31, 2006
INVENTOR(S) : Jurgen Engelbrecht and Martin Kix It is certified that error appears in the above-identified patent and that said Letters Patent is hereby corrected as shown below:

On the title page, add:
The following should be added to the cover page of the patent after section (65)

-- Related U.S. Application Data

(63)  Continuation of application No. 09/454,564 filed on Dec. 7, 1999, now abn. --

Signed and Sealed this

Twenty-fifth Day of December, 2007

JON W. DUDAS
*Director of the United States Patent and Trademark Office*